INVENTORS
Victor Weber and
Hugh J. Tyler

INVENTORS
Victor Weber and
Hugh J. Tyler
BY
Albert J. Henderson
THEIR ATTORNEY

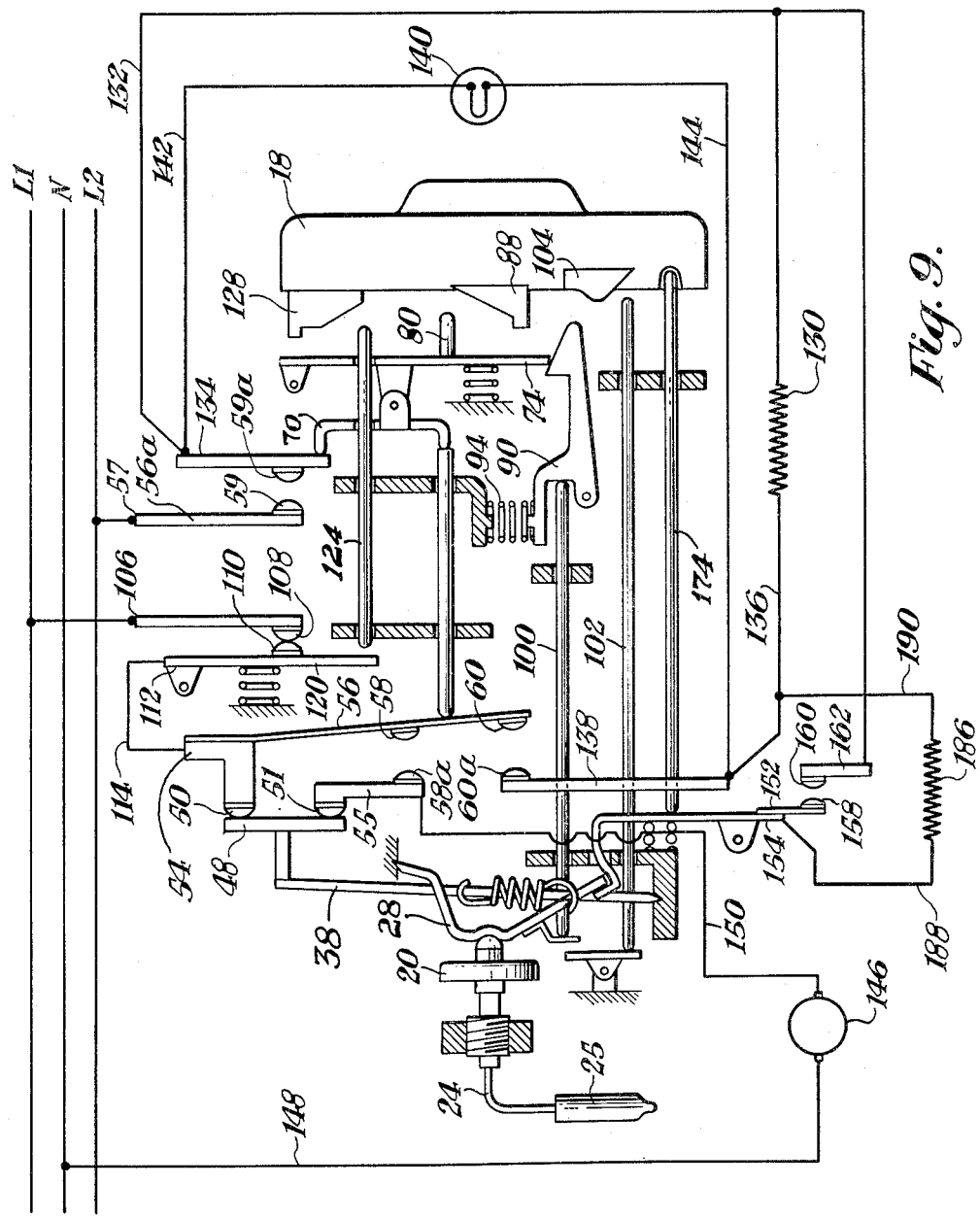

United States Patent Office 2,774,849
Patented Dec. 18, 1956

2,774,849

CONTROL DEVICE FOR ELECTRICALLY HEATED APPLIANCES

Victor Weber, Greensburg, and Hugh J. Tyler, Pittsburgh, Pa., assignors to Robertshaw-Fulton Controls Company, Greensburg, Pa., a corporation of Delaware Application January 5, 1954, Serial No. 402,374

13 Claims. (Cl. 200—140)

This invention relates to control devices and more particularly to condition responsive controls for electrically heated appliances, such as clothes driers, which include a motor driven shell or drum in which the clothes are placed and an electrical heating element from which heated air may be circulated through the drum.

In the past, control devices of this type have simultaneously completed a heating and a motor circuit and then sequentially broken the same as the temperature of the appliance rose to a first temperature and then dropped to a second temperature. U. S. Patent 2,564,868, Weber, et al., discloses such device. In the event the load being dried includes relatively heavy material, such as blankets or the like, the temperature of the appliance may rise sufficiently to deenergize the heating element when the exterior of such material is dry but the interior thereof is still wet. It is an object of this invention to prevent such unsatisfactory drying by extending the heating period through the reduction of the rate of heat input to the drum at elevated temperatures.

Another object of this invention is to utilize a high rate of heat input to bring a load rapidly to a temperature near the maximum drying temperature and thereafter utilize a reduced rate of heat input to complete the drying operation.

Another object of this invention is to adjust a control device to maintain a single rate of heat input to a drier if desired.

Another object of this invention is to utilize, in a drier, temperature responsive means to vary the rate of heat input, terminate the heat input and to maintain heat distributing means in operation for a predetermined period after the heat input is terminated.

In a preferred embodiment of this invention, switch means are provided for controlling energization of a clothes drier heating circuit and heat distributing means, and auxiliary switching means is utilized for controlling the rate of heat input of the heating circuit. All the switch means are normally controlled by thermally responsive means. However, manually operable means is provided for holding the auxiliary switching means in a selected controlling position for maintaining a predetermined heat input rate throughout the heating cycle.

Other objects and advantages will appear from the following description taken in connection with the accompanying drawings wherein:

Fig. 9 is a schematic view showing the electrical connections applicable to the embodiment of the invention shown in Figs. 1 through 8 when the same is applied to a clothes drier.

Figure 1:
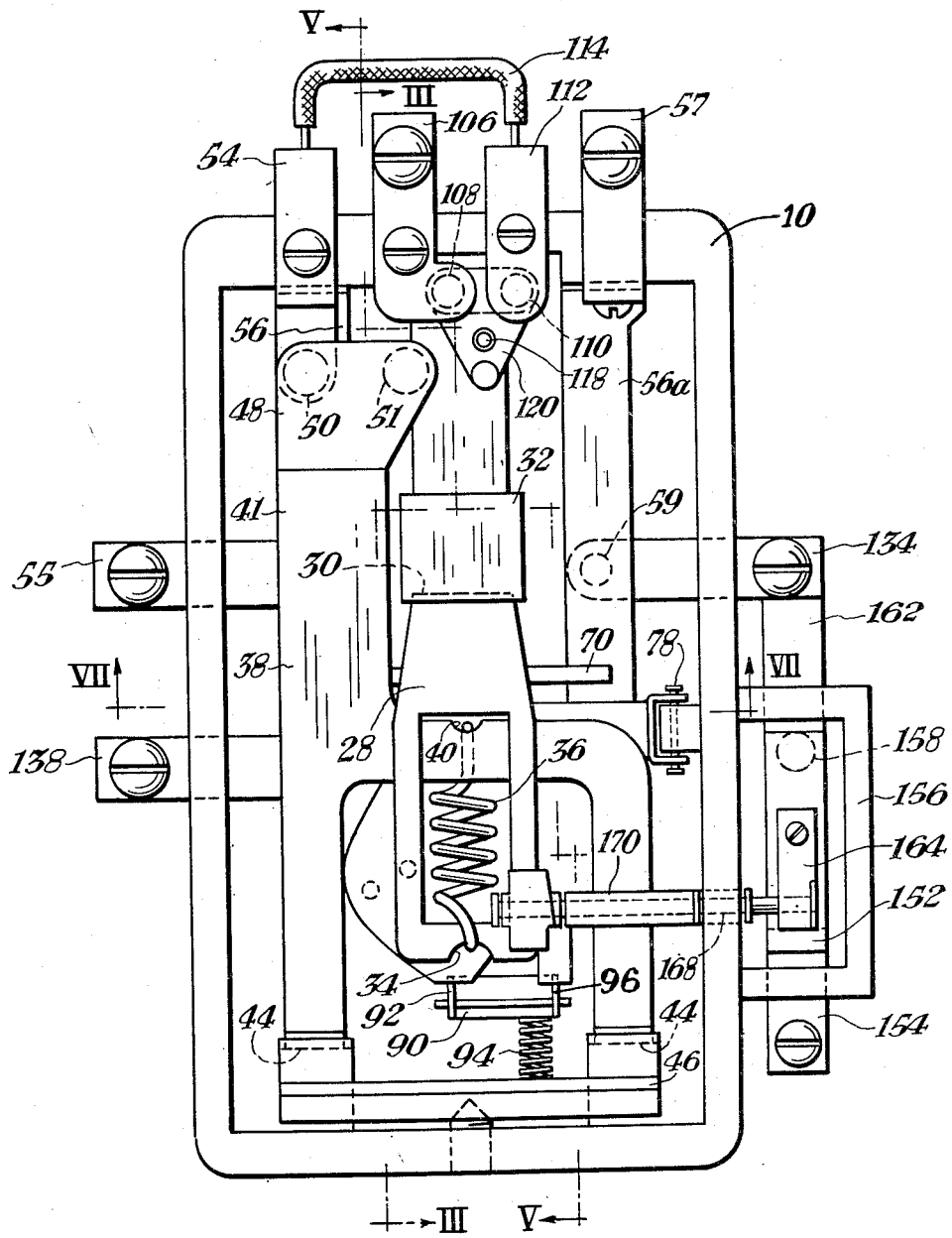
Fig. 1 is a front elevation of a control switch embodying this invention and having the cover thereof removed.
Figure 2:
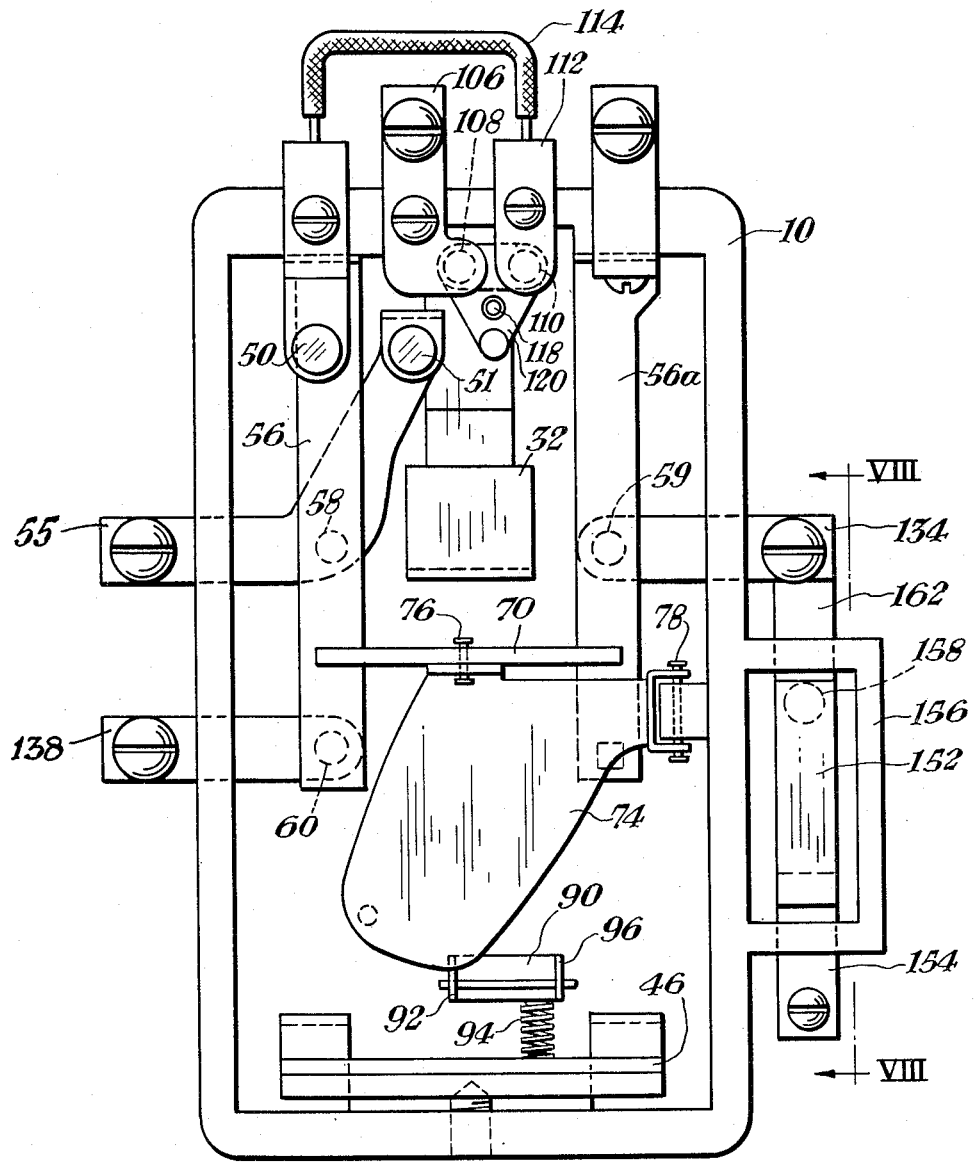
Fig. 2 is a view similar to that of Fig. 1 with the snap-action lever assembly of the switch removed to illustrate other parts thereof.

Referring more particularly to the drawings, a cup-shaped casing 10 is provided with a cover 12 for the open end thereof carrying a centrally disposed bushing 14. An adjusting screw 16, preferably provided with left-hand threads, is cooperable with the bushing 14 and carries on its exterior end the usual handle 18 by means of which the adjusting screw 16 can be rotated.

Temperature responsive means in the form of an expansible and contractible diaphragm element 20 is carried on the interior end of the adjustable screw 16 and has an operating button 22 projecting therefrom. The interior of the diaphragm 20 is in communication with a capillary tube 24 which extends exteriorly of the cover 12 for communication with the usual bulb element 25 adapted to be located in an area to be heated. The diaphragm 20, capillary tube 24, and bulb 25 are charged with a suitable thermal fluid which, when heated, will increase the pressure within the diaphragm unit 20 to expand the same and move the operating button 22 sufficiently to operate mechanism to be described hereinafter.

The button 22 extends into a depression 26 formed in the face of a main actuating lever 28 of a snap-action means. The main actuating lever 28 is provided at one end with a knife edge 30 which is cooperable with a support 32 projecting from the casing 10. The opposite end of the lever 28 is also provided with a knife edge 34 around which one end of a coil spring 36 is hooked.

A main control lever 38 of generally U-shaped configuration with a control arm 41 extending therefrom is provided with a knife edge 40 formed in the bight portion thereof for receiving the opposite hooked end of the coil spring 36. Preferably, an insulating section is incorporated in the extended control arm 41 of the main control lever 38 to insulate it from the lower legs thereof. The lower legs are each provided with a knife edge 44 for cooperation with suitable bearings formed on an adjustable bridge element 46 supported in the casing 10. The extended arm 41 of the main control lever 38 carries a double pole contact bridge 48 for cooperation with a pair of fixed contacts 50, 51 respectively carried by the casing 10. The contacts 50, 51 carry terminal connections 54, 55 for connection, through switching mechanism to be described hereinafter, to a line wire L1 and a motor circuit respectively.

A pair of flexible switch arms 56, 56a is secured at one end to the casing 10. The switch arm 56 is connected at its fixed end to the terminal 54 and the switch arm 56a is connected at its fixed end to a terminal connection 57 adapted to be connected to a second line wire L2. The switch arms 56, 56a are formed of flexible material of an electrical conducting nature and extend in a plane substantially parallel with the control lever 38 of the snap-action means.

The switch arm 56 carries a pair of spaced contacts 58, 60 on one side thereof. The switch arm 56a carries a single contact 59 on one side thereof. Secured to the inner surface of the casing 10 is a pair of fixed contacts 58a, 60a positioned for cooperation with the contacts 58, 60 respectively on the switch arm 56. The contact 58a is connected to the fixed contact 51. A third fixed contact 59a is secured to the inner face of the casing 10 for cooperation with the contact 59 on the switch arm 56a. Each of the switch arms 56, 56a has an inherent bias for holding the contacts 58, 59, 60 out of engagement with the fixed contacts 58a, 59a, 60a respectively.

Means is provided for moving the flexible switch arms 56, 56a to close the contacts 58, 58a, 60, 60a and 59, 59a. To this end, a movable member in the form of a toggle plate 70 of insulating material is provided for movement toward and away from the flexible switch arms 56, 56a and has a pair of projections 72 positioned to be operatively engageable with the switch arms 56, 56a respectively. The plate 70 is pivotally mounted in the casing 10 by the provision of an operating lever 74 which is secured to the toggle plate 70 at one end by a pin 76 and which is mounted at the other end on a pivot 78 carried on a wall of the casing 10. With this arrangement, the operating lever 74 is movable in a path transverse to the path of movement of the plate 70.

Manually operable means is provided for operating the operating lever 74 from the handle 18 and takes the form of a plunger 80 which projects through the cover 12 into engagement with the operating lever 74. A coil spring 82 is operative between an abutment 84 formed on the cover 12 and an abutment 86 carried on the plunger 80 for biasing the plunger 80 away from the operating lever 74.

Figure 4:
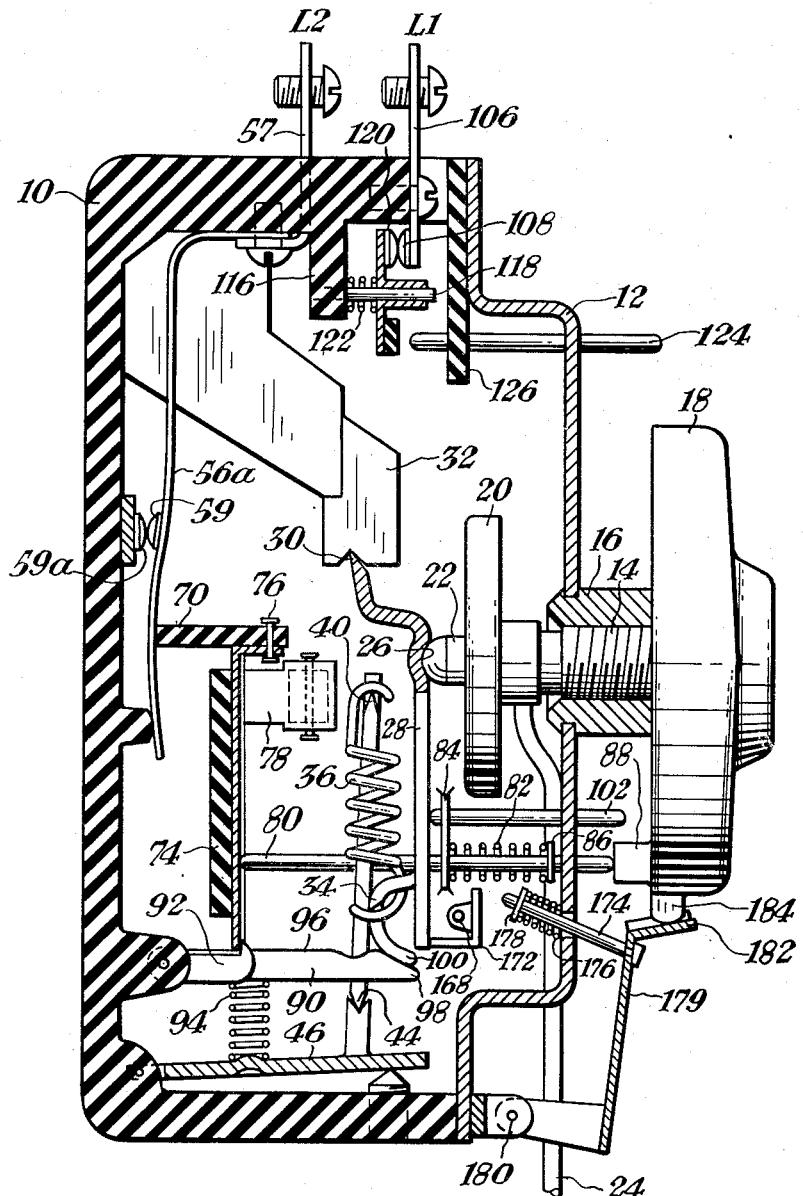
Figure 6:
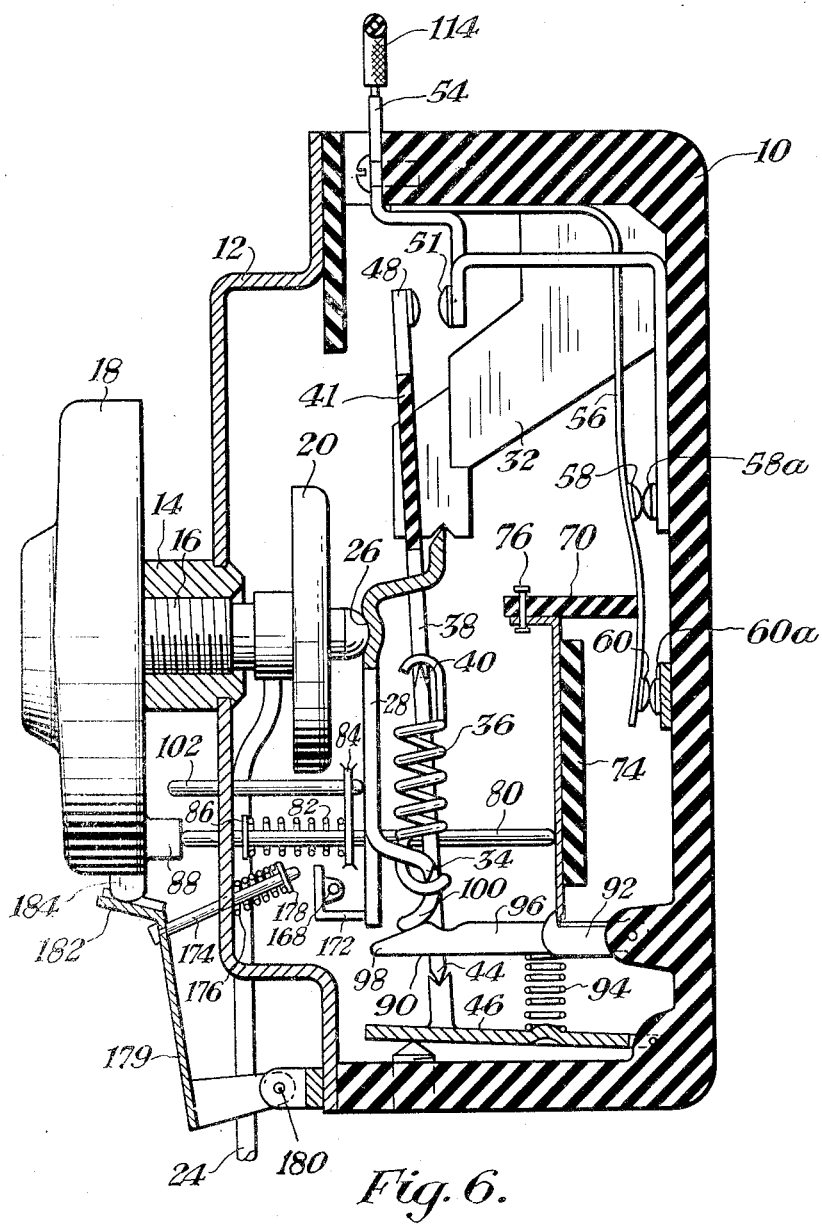
Figure 7:
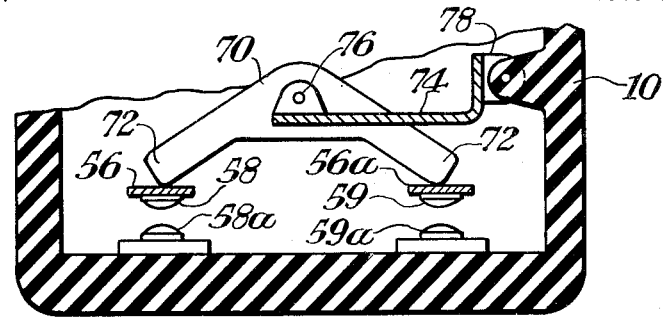
Fig. 7 is a fragmentary section taken on the line VII—VII of Fig. 1.

Convenient means for operating the plunger 80 at an appropriate angle of rotation of the handle 18 may be provided by a cam element 88 carried on the handle 18 for this purpose. In the embodiment shown and described herein, and as shown in Figs. 4 and 6, the cam element 88 is preferably positioned on the handle 18 so that the plunger 80 will be operated when the handle 18 is rotated to a point beyond its "high" temperature setting. Such operation will be more fully developed hereinafter.

It will be apparent that movement of the plunger 80 against the bias of the spring 82 will pivot the operating lever 74 about the pivot 78 to force the extensions 72 of the toggle plate 70 against the flexible switch arms 56, 56a causing flexing of the switch arms 56, 56a and closing of the contacts 58, 58a, 60, 60a and 59, 59a. Latching means is provided for retaining the switch arms 56, 56a in such flexed condition and is here shown as comprising a detent element 90 pivoted on the casing 10 and extending into the casing adjacent an edge of the operating lever 74.

The detent element 90 includes a pawl 92 biased toward the operating lever 74 by a spring 94 acting between the pawl 92 and the adjustable bearing support 46. As the operating lever 74 moves under the influence of the plunger 80, the lever 74 rides up over the pawl 92 until it reaches a position wherein the spring 94 can move the pawl 92 into latching engagement therewith. In this position of the lever 74, as shown in Figs. 4 and 6, the toggle plate 70 is in a position to maintain the switch arms 56, 56a in their flexed position with the contacts 58, 58a, 59, 59a and 60, 60a closed.

The detent element 90 also includes a cam arm 96 which extends parallel to the pawl 92 with the end portion 98 thereof disposed adjacent the main actuating lever 28 of the snap-action means. The end portion 98 of the cam arm 96 is formed to be engaged by a depending portion 100 of the main actuating lever 28 when the main actuating lever is in a predetermined position, engagement of the depending portion 100 of the main actuating lever 28 with the end portion 98 of the cam arm 96 as the main actuating lever 28 moves towards such predetermined position being effective to move the cam arm 96 against the bias of the spring 94. The pawl 92 is secured to the cam arm 96 to move therewith so that movement of the main actuating lever 28 to the aforesaid predetermined position will be effective to move the pawl 92 out of engagement with the operating lever 74 thereby releasing the toggle plate 70, permitting the switch arms 56, 56a to return to their unflexed condition and opening contacts 58, 58a, 59, 59a and 60, 60a.

Figure 3:
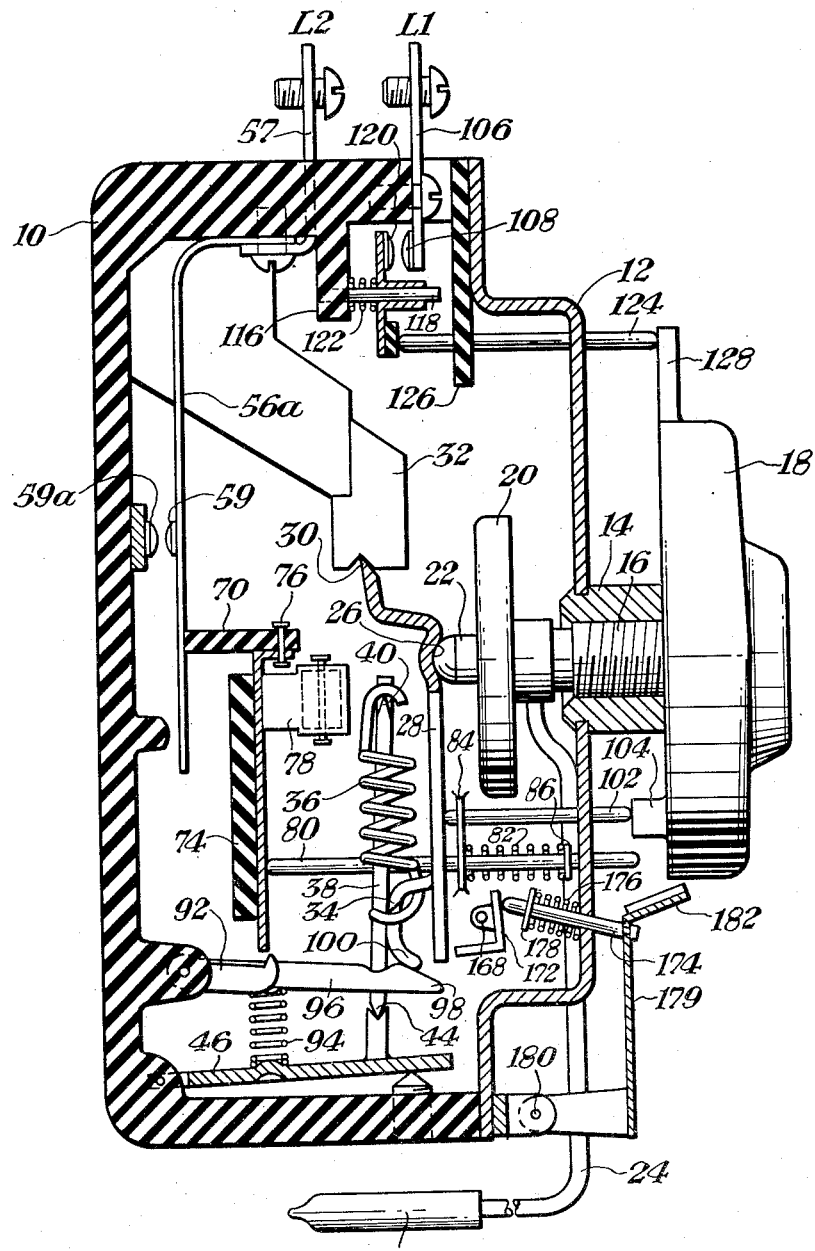
Figs. 3 and 4 are longitudinal sections taken on the line III—III of Fig. 1 and showing the operating parts in different positions.
Figure 5:
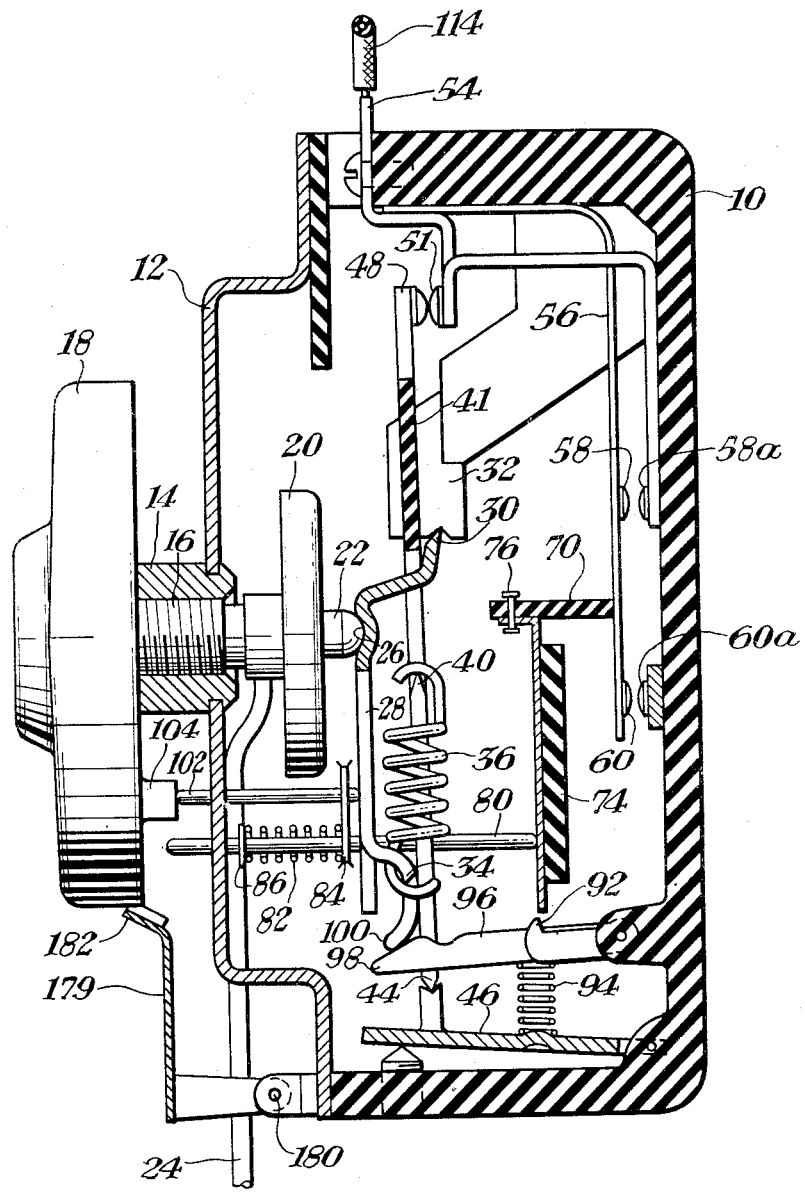
Figs. 5 and 6 are longitudinal sections taken on the line V—V of Fig. 1 and showing the operating parts in different positions.

Since the operating button 22 of the expansible diaphragm element 20 is engageable with the main operating lever 28, the expansible diaphragm element 20 will be effective to move the main operating lever 28 to the aforesaid predetermined position to effect release of the operating lever 74 when a predetermined temperature is sensed by the bulb 25. However, it is sometimes desirable to effect release of the operating lever 74 from the pawl 92 prior to heating of the bulb 25 to such predetermined temperature. Accordingly, manually operable means is provided for unlatching the operating lever 74, such means preferably being effective to move the main operating lever 28 of the snap-action means to the aforesaid predetermined position wherein the depending portion 100 thereof will engage the end portion 98 of the cam arm 96 to position the pawl 92 out of engagement with the operating lever 74. This means is here shown as a plunger 102 slidably mounted in the cover 12 and in the abutment 84 formed on the cover 12. One end of the plunger 102 extends into engagement with the main actuating lever of the snap-action means and the other end of the plunger 102 extends out of the cover 12 to be engageable by a cam element 104 carried on the handle 18. The angular location of the cam element 104 on the handle 18, as shown in Figs. 3 and 5, is preferably such that the cam element 104 will engage the plunger 102 when the handle 18 is positioned in the "off" position and the proportions of the cam element 104 are such that upon engagement of the plunger 102 thereby, the main actuating lever 28 of the snap-action means will be moved through a distance sufficient to effect unlatching of the operating lever 74 as hereinbefore described.

The connection of terminal 54 to line wire L1 is preferably controlled through auxiliary switching means interposed between the terminal 54 and a terminal connection 106 adapted for direct connection to the line wire L1. The switching means comprises a pair of contacts 108, 110 which are supported within the casing 10 and connected to the terminal connection 106 and to a terminal 112 respectively. The terminal 112 is connected to the terminal 54 by an external jumper 114. Mounted on a lug 116 formed on the casing 10 and extending into the interior thereof is a pintle 118 which slidably supports a contact bridge 120. Acting between the lug 116 and the bridge 120 is a coil spring 122 which serves to bias the latter toward the contacts 108, 110.

Manually operable means is provided for moving the contact bridge 120 against the bias of the spring 122 and out of engagement with the contacts 108, 110. This means is here shown as comprising a plunger 124 slidably mounted in the cover 112 and in a suitable bearing 126. One end of the plunger 124 extends into engagement with the bridge 120 and the other end thereof extends out of the cover 12 to be engageable by a cam element 128 formed on the handle 18. The angular location of the cam element 128 on the handle 18, as shown in Fig. 3, is such that the cam element 128 will engage the plunger 124 whenever the cam element 104 engages the plunger 102. Preferably, such engagement occurs when the handle 18 is in the "off" position.

The hereinbefore described switching apparatus has been disclosed and claimed in the copending application of Russell F. Garner and William J. Russell, Serial No. 399,432, filed Dec. 21, 1953, now Patent No. 2,715,664, and with such a device, the switching means comprising the switch arms 56, 56a may be utilized to control the energization of a heater circuit, acting to deenergize such a circuit when the bulb 25 senses a predetermined temperature. However, in the drying of relatively heavy materials, it is desirable to prevent the bulb 25 from being heated to such a predetermined temperature until the material has been heated for a period long enough to completely dry the same. It is also desirable to bring the material being dried up to a drying temperature approaching the maximum as rapidly as possible. Accordingly, means is provided for varying the rate of heat input to the drum, such means preferably taking the form of switching means for varying the heat output rate of the heating circuit.

To this end, auxiliary switching means is provided and takes the form of a flexible switch arm 152 carried on a terminal 154 which extends into a housing 156 secured to an exterior wall of the casing 10. The switch arm 152 carries a contact 158 which is engageable with a fixed contact 160 carried on a terminal 162 extending into the housing 156.

The switch arm 152 is formed of a flexible, electrically conductive material having an inherent bias tending to hold the contact 158 out of engagement with the contact 160 and means is provided for flexing the switch arm 152 to close the contacts 158, 160. This means comprises a lever 164 extending substantially parallel with the switch arm 152 and having a thrust button 166 of electrically insulating material extending into engagement with the lever 152. The lever 164 is secured to one end of a shaft 168 to be rotatable therewith. The shaft 168 extends through the wall of the casing 10 and a suitable bearing 170 in the casing 10, and terminates adjacent the main actuating lever 28 of the snap-action means.

Secured to the end of the shaft 168 which extends into the casing 10 and adapted to rotate therewith is an angular operating lever 172, one leg of which extends toward the main actuating lever 28 of the snap-action means and the other leg of which extends substantially parallel with the cover 12. The operating lever 172 is positioned to be engageable by the main actuating lever 28 of the snap-action means in a contracted condition of the diaphragm unit 20 and, when engaged by the main actuating lever 28, is adapted to hold the lever 164 in a position to maintain the contacts 158, 160 closed. However, as the diaphragm unit 20 expands in response to an increase in the temperature sensed by the bulb 25, the main actuating lever 28 will be moved away from the operating lever 172, freeing the same and permitting the switch arm 152 to move under its inherent bias and open the contacts 158, 160. Thus, the contacts 158, 160 may be controlled by the temperature responsive means comprising the diaphragm 20, capillary tube 24 and bulb 25 and may be utilized to vary the rate of heat output of a heater circuit in response to temperatures sensed by the bulb 25 to extend the drying period as will more fully appear hereinafter.

When the load being dried is composed of relatively light weight material, extension of the drying time through reduction of the heat input rate to the drum is unnecessary. Accordingly, manually operable means is provided for holding the contact 158 in engagement with the contact 160 throughout the drying cycle regardless of expansion or contraction of the diaphragm unit 20. This means takes the form of a reciprocable plunger 174 extending through the cover 12 along an axis substantially parallel with the axis of the adjusting screw 16. The plunger 174 is biased into engagement with the operating lever 172 by a spring 176 acting between the cover 12 and a suitable collar 178 formed on the plunger 174.

Figure 8:
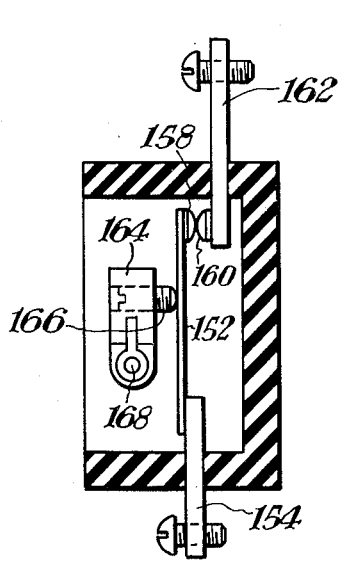
Fig. 8 is a fragmentary section taken on the line VIII—VIII of Fig. 2.

In the active position of the plunger 174 wherein it is in engagement with the operating lever 172, the spring 176 is effective to rotate the operating lever 172 in a counterclockwise direction as viewed in Fig. 3 and hold the lever 164 in the position shown in Fig. 8 to maintain the contact 158 in engagement with the contact 160. It is to be noted that when the plunger 174 thus engages the operating lever 172, the operating lever 172 will remain out of engagement with the main actuating lever 28 of the snap-action means and will be uneffected by movement thereof.

The end of the lever 174 which extends out of the cover 12 is connected to a lever device 179 which is pivoted at one end 180 on the cover 12. The other end 182 of the lever 179 takes the form of an arcuate cam follower and extends into proximity with the periphery of the handle 18 to be engageable by a cam element 184 formed thereon. The angular location of the cam element 184 relative to the handle 18 is preferably such that the cam element 184 will engage the end 182 of the lever 179 when the handle 18 is positioned in a range of relatively high temperature settings. The configuration of the cam element 184 is such that engagement thereof with the end 182 of the lever 179 will move the lever 179 in a clockwise direction as viewed in Figs. 3 and 4 about the pivot 180 to move the plunger 174 against the bias of the spring 176 and out of engagement with the operating lever 172. Thus, when the cam element 184 is in engagement with the end 182 of the lever 179, the operating lever 172 is free to follow movements of the main actuating lever 28 of the snap-action means and movement of the switch arm 152 will be under the control of the temperature responsive means comprising the diaphragm unit 20, capillary tube 24, and bulb 25.

Referring more particularly to the wiring diagram shown in Fig. 9, it will be apparent that the terminals 106, 57 may be connected respectively to line wires L1, L2 of a three-wire power source. A heating element 130 has one end connected by a wire 132 to a terminal 134 extending from the casing 10 and connected to contact 59a. The other end of the element 130 is connected by a wire 136 to a terminal 138 which extends out of the casing 10 and is connected to the contact 60a. A pilot light 140 may be connected in parallel with the element 130 by wires 142, 144 to be energized whenever the element 130 is energized. A second heating element 186 is connected to the terminal 154 by a wire 188 and to the terminal 138 by a wire 190. The terminal 162 is connected to the terminal 134 by wire 132. Thus, when the contacts 158, 160 are closed, the heating element 186 is connected in parallel with the heating element 130.

Heat distributing means in the form of a fan or blower (not shown) operated by an electric motor 146 is provided for circulating heated air through a load of material which is placed in the drying drum (not shown) to be dried. The motor 146 may also operate the drum which revolves during the drying operation. The motor 146 is shown in Fig. 9 as having one terminal connected to neutral wire N of the three-wire power source by a wire 148 and having the opposite terminal connected by a wire 150 to the terminal 55 which extends from the casing 10 and is connected to the contact 58a.

Further description of circuits for the heating elements 186, 130 and the motor 146 will be given in connection with a description of the operation of the device which follows.

In the operation of the device, it may be assumed that the handle 18 is in the "off" position as shown in Figs. 3 and 5 so that the cam element 104 has forced the plunger 102 inwardly to engage the main actuating lever 28 of the snap-action means to position the depending portion 100 thereof in engagement with the end portion 98 of the cam arm 96. The flexible switch arms 56, 56a are thus free to assume their unflexed position to maintain the contacts 58, 58a, 60, 60a and 59, 59a in their open positions. Since the cam element 184 is out of engagement with the lever 179, the plunger 174 is in its active or biased position to hold the contacts 158, 160 in engagement with each other. Also, in the "off" position of the handle 18, the cam element 128 has forced the plunger 124 inwardly to hold the contact bridge 120 out of engagement with the contacts 108, 110. Thus, the circuits are broken on both sides of the line and movement of the handle 18 in a counterclockwise direction is required to disengage the plungers 102, 124 from the cam elements 104, 128 respectively.

Rotation of the handle 18 in a counterclockwise direction from "off" to a preselected "start" setting, preferably beyond the highest temperature setting, will cause outward longitudinal movement of the stud 16 and similar movement of the diaphragm 20 and button 22. This movement is sufficient to operate the main actuating lever 28 through a distance effective to cause snap action of the main control lever 38. Thus, the auxiliary switching means for the motor 146 comprising the main control lever 38 remains in a position where the contact bridge 48 is disengaged from the contacts 50, 51.

In the "start" position of the handle 18, as best shown in Figs. 4 and 6, the cam element 88 is in engagement with the plunger 80 to force the same inwardly, causing rotation of the operating lever 74 into latching engagement with the pawl 92 and moving the toggle plate 70 to a position which will flex the switch arms 56, 56a and close contacts 58, 58a, 60, 60a and 59, 59a. In addition, in the "start" position of the handle 18, the cam element 184 is in engagement with the end 182 of the lever 179 to position the same to maintain the plunger 174 in its inactive position out of engagement with the operating lever 172 thereby permitting the inherent bias of the switch arm 152 which tends to hold the contact 158 out of engagement with the contact 160 to hold the operating lever 172 in engagement with the main actuating lever 28 of the snap-action means through the lever 164 and shaft 168.

The handle 18 may then be rotated in a clockwise direction to a desired "high" temperature setting intermediate the "off" and "start" positions with the cam element 184 being maintained in engagement with the arcuate cam follower 182 on the lever 179. Such return movement of the handle 18 will move the cam element 88 out of engagement with the plunger 80 to permit the same to return to its outermost position out of engagement with the operating lever 74 under the bias of the spring 82.

As the handle 18 moves in a counterclockwise direction from the "off" position, the cam element 128 is moved out of engagement with the plunger 124 to permit the contact bridge 120 to move along the pintle 118 under the bias of the spring 122 to engage contacts 108, 110 thereby completing the circuit between the terminal 106 and the terminal 54 through the jumper 114.

It is to be noted that in the initial relatively cool condition of the bulb 25, the diaphragm unit 20 is contracted and the main actuating lever 28 will be positioned relatively close to the cover 12 to engage the operating lever 172 as shown in Figs. 4 and 6 for moving the switch arm 152 against its bias and closing the contacts 158, 160.

A circuit may now be traced on Fig. 9 from line wire L1 to terminal 106, contacts 108, 110, contact bridge 120, terminal 112, jumper 114, terminal 54, switch arm 56, contacts 60, 60a, terminal 138, wire 136, heating element 130, wire 132, terminal 134, contacts 59, 59a, switch arm 56a, and terminal 57 to line wire L2. The energizing circuit for the element 130 is thus complete.

At the same time, the heating element 186 is connected in parallel with the element 130 through a circuit which may be traced from the terminal 138, wire 136, wire 190, element 186, wire 188, terminal 154, switch arm 152, contacts 158, 160, terminal 162, and wire 132 to terminal 134. Since the terminals 138, 134 are connected across line wires L1, L2 by the previously traced energizing circuit for the element 130, the element 186 is also connected across line wires L1, L2 in parallel with the element 130.

At the same time, a circuit for the motor 146 may also be traced from line wire L1 to terminal 106, contacts 108, 110, contact bridge 120, terminal 112, jumper 114, terminal 54, switch arm 56, contacts 58, 58a, terminal 55, wire 150, motor 146, and wire 148 to line wire N. Thus, the circuit for the motor 146 is completed and operation of the heating elements 130, 186 and motor 146 can occur.

As the temperature in the drying apparatus increases, the diaphragm unit 20 will expand to move the main actuating lever 28 away from the cover 12, pivoting the same about the knife edge 30 and moving the lower end thereof away from the operating lever 172. As the main actuating lever 28 moves away from the operating lever 172, the restraining influence of the same on the switch arm 152 is removed and the inherent bias of the latter moves the contact 158 away from the contact 160. The energizing circuit for the heating element 186 is thus broken. It is to be noted that the energizing circuits for the heating element 130 and motor 146 remain complete, so that the element 130 will continue to supply heat to the appliance. However, since the element 186 is deenergized, the rate of heat input to the appliance will be reduced to an amount equal to the heat input rate of the element 130 and the rate of temperature rise in the appliance will also be reduced. Preferably, the various parts of the device are proportioned to cause opening of the contacts 158, 160 as the maximum drying temperature is approached.

When the temperature in the drying apparatus reaches that which has been preselected on the dial 18, the diaphragm 20 will be expanded sufficiently to cause overcenter snap action of the main control lever 38 to close contacts 50, 51. Thereupon, a second energizing or holding circuit for the motor 146 is completed and may be traced as follows: from line wire L1 to terminal 106, contacts 108, 110, contact bridge 120, terminal 112, jumper 114, terminal 54, contact 50, contact bridge 48, contact 51, terminal 55, wire 150, motor 146, and wire 148 to line wire N.

Further temperature rise in the drying appliance will cause additional expansion of the bellows 20 and further movement of the main actuating element 28 to move the depending portion 100 thereof into engagement with the end portion 98 of the cam arm 96 for disengaging the pawl 92 from the operating lever 74. Release of the operating lever 74 will permit movement of the switch arms 56, 56a under their inherent bias to their unflexed positions and opening of the contacts 58, 58a, 60, 60a, and 59, 59a. Accordingly, the first traced circuit for the motor 146 and the energizing circuit for the heating element 130 are broken. Thus, the heater 130 is deenergized, but the motor 146 remains energized through the second traced energizing or holding circuit therefor.

When the temperature at the bulb 25 drops an amount corresponding to the differential of the thermostat, the diaphragm 20 contracts sufficiently to cause over-center snap action of the main control lever 38 in the opposite direction. The auxiliary switching means comprising the contacts 50, 51 and contact bridge 48 is therefore opened to break the holding circuit for the motor which thereupon ceases to run.

In the event the handle 18 is rotated in a clockwise direction from the "start" position to a position between "off" and "start" corresponding to a relatively low temperature setting and wherein the cam 184 is out of engagement with the end 182 of the lever 179, the plunger 174 is free to assume its active position under the bias of the spring 176 and will engage the operating lever 172 to hold the same in a position to maintain the contact 158 in engagement with the contact 160.

When the plunger 174 is in its active position, the operating lever 172 will be maintained out of engagement with the main actuating lever 28 of the snap-action means and, accordingly, will be unaffected by expansion and contraction of the diaphragm unit 20. Thus, the contact 158 will be maintained in engagement with the contact 160 throughout the heating cycle to maintain the element 186 connected in parallel with element 130 regardless of temperature sensed by the bulb 25. Accordingly, in a relatively low temperature setting position of the knob 18, both elements 130 and 186 are utilized throughout the heating cycle to maintain a high rate of heat input throughout the heating portion of the drying cycle.

In the event that it is desired to terminate the drying operation after the appliance has been placed in operation as described above, the handle 18 is merely returned to the "off" position wherein the cam elements 104, 128 move into engagement with the plungers 102, 124 respectively to move the same to their innermost positions. Inward movement of the plunger 102 will impart movement to the main actuating lever 28 similar to movement imparted thereto by thermostatic action of the diaphragm 20. However, such movement of the main actuating lever 28 will be independent of the diaphragm 20 and will move the depending portion 100 into engagement with the end portion 98 of the cam arm 96 to disengage the pawl 92 from the operating lever 74 thereby permitting the switch arms 56, 56a to move under their inherent bias and break contacts 58, 58a, 60, 60a and 59, 59a to cause deenergization of the elements 130, 186. Movement of the main actuating lever 28 by the plunger 102 will also cause over-center snap action of the main control lever 38 and closing of the contacts 50, 51 by the contact bridge 48. However, such movement of the main control lever 38 is ineffective to energize the motor 146 since the energizing circuit therefor is broken by inward movement of the plunger 124 to move the contact bridge 120 out of engagement with the contacts 108, 110.

Figure 10:
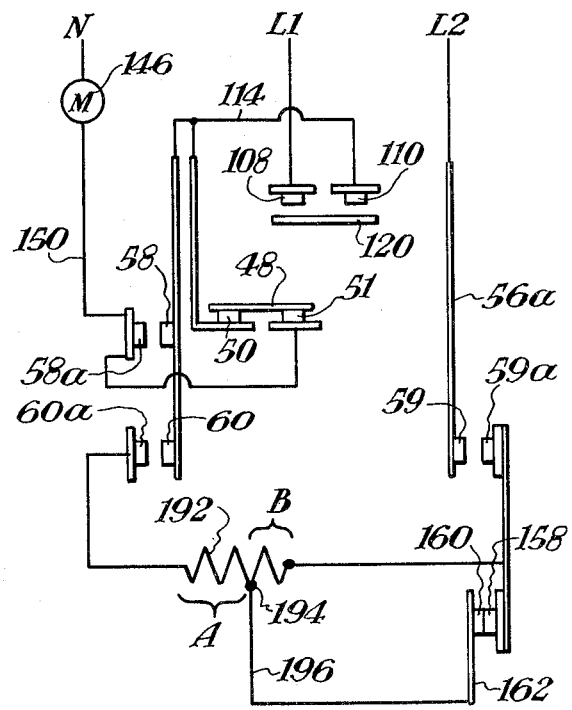
Fig. 10 is a wiring diagram showing an alternative arrangement of the connections shown in Fig. 9.

Referring to the modified wiring diagram of Fig. 10, the hereinbefore described switching device is shown as controlling the operation of a single heating element 192 which comprises a pair of series connected resistors A, B with their junction defining a tap 194. The heating element 192 is connected to the contacts 60a, 59a in the same way as is the heating element 130 of Fig. 9. The switch arm 162 is connected to the tap 194 by a wire 196 so that closing of the contacts 158, 160 will shunt resistance B of the element 192. With this arrangement, the element 192 will have a relatively high heat input rate when the contacts 158, 160 are closed, with opening of the contacts 158, 160 being effective to cut in resistor B of element 192 to reduce the rate of heat input of the element 192. It will therefore be apparent that with the hook-up as shown in Fig. 10, the switching device of this invention will function in the same manner as it does with the hook-up shown in Fig. 9.

It will be apparent from the foregoing that the apparatus described herein is capable of utilizing a high rate of heat input to bring a load up to a temperature approaching the maximum drying temperature and thereafter utilizing a reduced rate of heat input to complete the drying operation, as well as being adjustable to maintain a single rate of heat input if desired, and that accordingly it accomplishes the objects of the invention. On the other hand, it will be understood that various changes may be made in the details of construction and arrangement of parts and that the control device may be utilized for useful purposes other than clothes drying controls without departing from the scope of the invention as defined in the appended claims.

It is claimed and desired to secure by Letters Patent:

1. In a control device for clothes driers having means for producing heat and heat distributing means, the combination of means for controlling the rate of heat output of the heat producing means, switching means movable between open and closed positions for controlling said heat distributing means, means for setting said control means to maintain a first heat output rate, means responsive to a temperature condition to be controlled, means for setting said control means to maintain a second heat output rate lower than said first rate upon a change in said temperature condition affecting said temperature responsive means, means for setting said control means to terminate the heat output of the heat producing means upon a further change in said temperature condition affecting said temperature responsive means, and means for moving said switching means between said positions upon an additional further change in said temperature condition affecting said temperature responsive means.

2. In a control device for apparatus having electrically operated heating means and heat distributing means comprising switching means movable between a plurality of positions for controlling a heating circuit including the heating means, said switching means having one position wherein the heating means has a high heating rate and another position wherein the heating means has a lower heating rate, second switching means movable between open and closed positions for controlling an energizing circuit for said heating circuit, means for moving said first switching means to said one position and said second switching means to said closed position, third switching means movable between open and closed positions for controlling an energizing circuit for the heat distributing means, means responsive to a temperature condition to be controlled, means for moving said first switching means to said other position upon a change in said temperature condition affecting said temperature responsive means, means for moving said second switching means to said open position upon a further change in said temperature condition affecting said temperature responsive means, and means for moving said third switching means to said open position to discontinue said energizing circuit for said heat distributing means upon an additional further change in said temperature condition affecting said temperature responsive means.

3. A control device as claimed in claim 2 wherein manually operable means is provided for holding said first switching means in said one position regardless of changes in said temperature condition affecting said temperature responsive means.

4. A control device for appliances having electric heating and heat distributing means comprising switching means movable between a plurality of positions for controlling the heating means, said switching means having one position wherein the heating means has a high heating rate and another position wherein the heating means has a lower heating rate and being biased to said other position, second switching means movable between open and closed positions for controlling an energizing circuit for the heating means, third switching means movable between open and closed positions for controlling an energizing circuit for the heat distributing means, means including a manually operable element movable between a plurality of controlling positions for closing said second and third switching means to establish said energizing circuit when said element is moved to one of said positions, auxiliary switching means having open and closed positions for controlling said energizing circuit for said heat distributing means independently of said switching means therefor, means responsive to changes in a condition to be controlled, means for moving said first switching means to said other position upon a change in said temperature condition affecting said temperature responsive means, means for opening said second and third switching means upon a further change in said condition affecting said temperature responsive means and for substantially simultaneously closing said auxiliary switching means to maintain said energizing circuit for said heat distributing means, means for opening said auxiliary switching means to discontinue said energizing circuit for said heat distributing means upon an additional further change in said temperature condition affecting said temperature responsive means.

5. A control device as claimed in claim 4 wherein means operatively associated with said manually operable element is provided for holding said first switching means in said one position when said manually operable element is in another of said positions regardless of the temperature sensed by said temperature responsive means.

6. A control device comprising switching means having open and closed positions for controlling an energizing circuit, switching means having open and closed positions for controlling a second energizing circuit, third switching means having open and closed positions for controlling a third energizing circuit, means including a manually operable element movable between a plurality of controlling positions for closing all of said switching means to establish said circuits when said element is moved to one of said positions, auxiliary switching means having open and closed positions for controlling the first said circuit independently of said switching means therefor, means responsive to changes in a temperature condition to be controlled, means for opening said first and second switching means upon a change in said temperature condition affecting said temperature responsive means and for substantially simultaneously closing said auxiliary switching means to maintain said first circuit, means for opening said third switching means to discontinue said third energizing circuit upon a further change in said temperature condition affecting said temperature responsive means, and means for opening said auxiliary switching means to discontinue said first circuit upon an additional further change in said temperature condition affecting said temperature responsive means.

7. A control device as claimed in claim 6 wherein means operatively associated with said manually operable element is provided for holding said second switching means in said closed position when said manually operable element is in another of said positions regardless of the temperature sensed by said temperature responsive means.

8. A thermostatic control device comprising a first switch including a switch arm operable between controlling positions, a second switch including a switch arm operable between controlling positions and biased to one of said positions, manually operable means for moving said second switch arm to another of said positions, latching means for holding said second switch arm in said other position, a third switch connected to said second switch and including a switch arm operable between controlling positions, temperature responsive means including a movable element, and means for sequentially operating said first and third switch arms from first to second controlling positions and then releasing said latching means as said element moves in one direction in response to variations in a temperature condition affecting said temperature responsive means, said last named means further returning said first switch arm to said first controlling position upon return movement of said element in an opposite direction.

9. A control device as claimed in claim 8 wherein manually operable means is provided for holding said third switch arm in said first position regardless of movement of said element.

10. A thermostatic control device comprising a first switch including a switch arm movable between controlling positions, a second switch including a switch arm movable between controlling positions and biased to one of said positions, manually operable means for moving said second switch arm to another of said positions, latching means for holding said second switch arm in said other position, a third switch connected to said second switch including a switch arm movable between controlling positions and biased to one of said positions, a reciprocable member operatively associated with said third switch arm and biased to an active position for holding said third switch arm in another of said positions, manually operable means for positioning said member in an inactive position wherein said third switch arm is free to move to said one position, means responsive to a temperature condition to be controlled, means for holding said third switch arm in said other position when the temperature sensed by said temperature responsive means is within a predetermined range and freeing said third switch arm for movement to said one position when the temperature sensed by said temperature responsive means is above said range, means for releasing said latching means and substantially simultaneously moving said first switch arm from one to another of said controlling positions in response to a predetermined temperature sensed by said temperature responsive means, said last named means further returning said first switch arm to said one position in response to a second predetermined temperature sensed by said temperature responsive means.

11. A control device as claimed in claim 10 wherein temperature adjusting means including a rotatable element is provided for said temperature responsive means, both said manually operable means including cam means operatively associated with said rotatable element.

12. In a thermostatic control device for electrically heated clothes driers having switching means for controlling energization of a heating circuit, temperature responsive means for actuating the switching means, and rotatable temperature adjusting means for the temperature responsive means and movable through a range of temperature settings, the combination of switching means having a switch arm movable between positions for controlling the heat output rate of the heating circuit, means for moving said switch arm between said positions in response to changes in a temperature condition sensed by the temperature responsive means while the rotatable means is in one portion of said range, and means for holding said switch arm in one of said positions while the rotatable means is in another portion of said range.

13. A control device as claimed in claim 12 wherein said one portion of said range includes relatively high temperature settings and said other portion includes relatively low temperature settings.

References Cited in the file of this patent

UNITED STATES PATENTS

| | | |
|---|---|---|
| 1,974,302 | Finlayson | Sept. 18, 1934 |
| 2,332,639 | Hudson | Oct. 26, 1943 |
| 2,398,880 | Broglie | Apr. 23, 1946 |
| 2,564,868 | Weber et al. | Aug. 21, 1951 |
| 2,616,019 | Guillot et al. | Oct. 28, 1952 |